A. B. CLARDY.
SCALE.
APPLICATION FILED OCT. 18, 1916.

1,279,261.

Patented Sept. 17, 1918.

WITNESSES

INVENTOR
A. B. Clardy
BY
ATTORNEYS

UNITED STATES PATENT OFFICE.

ALBERT BASIL CLARDY, OF BALBOA, CANAL ZONE.

SCALE.

1,279,261.   Specification of Letters Patent.   Patented Sept. 17, 1918.

Application filed October 18, 1916. Serial No. 126,239.

*To all whom it may concern:*

Be it known that I, ALBERT B. CLARDY, a citizen of the United States, and a resident of Balboa, in the Canal Zone, have invented a new and Improved Scale, of which the following is a full, clear, and exact description.

My invention relates to a combination of scales particularly adaptable for use by sheet-metal workers in the development of different shaped patterns.

An object of the invention is to provide a straight-edged ruler having various scales thereon whereby the various computations necessary in the execution of work in sheet metal is considerably simplified and carried out more rapidly.

A further object of the invention is to provide a ruler of the class described with which various patterns may be laid out with the least amount of computation and, therefore, with less possibility of mistakes.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1:
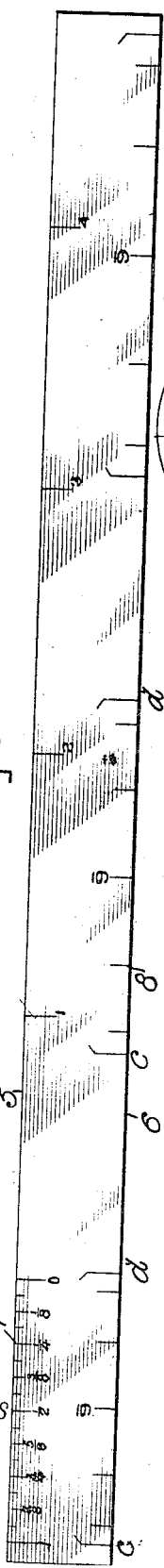
Figure 1 is a face elevation of a ruler embodying my invention.

Referring to the drawings, the body of the ruler is preferably of metal with parallel longitudinal edges 5 and 6. A scale 7 located on one face of the ruler at the edge 5 is for use in measuring off the circumference of given diameters without the necessity of multiplying the diameters by the constant ratio 3.1416. For example, the length of the circumference of a $2\frac{1}{4}$ inch diameter is obtained by taking on the said scale 7 $2\frac{1}{4}$, that is, measuring from the 2 to the right of the zero up to $\frac{1}{4}$ to the left of the zero, we will have the length of the circumference the diameter of which is $2\frac{1}{4}$ inches.

The scale 8 on the same face at the edge 6 is in reality a number of scales of different lengths each presenting six divisions, and the most frequent use of these scales is to divide a semicircumference into six equal parts (see Fig. 3); in which case the semi-circumference A is divided into six equal parts by means of any of the scales 8 by drawing tangents to the circumference at the diameter $a$—$b$ of the simicircumference and by placing any of the scales 8 so that the extreme points $c\,d$ of any of those scales lie on the tangent lines previously mentioned, the points $c\,d$ being indicated. The intermediate divisions of the scale 8 between the points $c\,d$ will give the points through which lines parallel to the tangent lines could be drawn, and which will divide the semicircumference into six equal parts, as clearly shown in said Fig. 3.

The other face of the ruler has scales 9 at the edge 5 which are to divide a circumference into 8 equal parts. The operation of this scale is in the manner as described with reference to scale 8. A similar scale 9 is provided on the same face at the edge 6. The same face carries also a scale 10 at the edge 6, which is adapted for dividing a semicircumference into ten equal parts. It will be noted that the scales 8 to 10 inclusive are scales for dividing a semicircumference or a circumference into equal parts, the number of parts depending on the scale used.

The ruler also carries a scale 11, preferably placed on the face which carries the scales 9 and 10, and the said scale 11 is located between the edges 5 and 6 substantially in the middle of the face. This scale carries divisions so related to the total length of the scale that any desired fraction of a 90° angle may be constructed by means of said scale, as follows: Let us assume that $o$—$e$ is the base line with which a line $o$—$f$ is to form an angle of 9°. From $o$ as a center draw a line $o\,e$, representing the length of the scale 11, then from the point $e$ intersect the arc $e\,f$ with a length measured from the point $o$ to 10 on the scale 11 and draw through the said intersection the line $o$—$f$ from the point $o$. If, for example, it is desirable to construct an angle of, say, $42\frac{1}{2}°$ from the base line, this is done by the use of the scale 11 in the following manner: The length of the scale from $o$ to 3 plus that of $o$ to 4 minus that of $o$ to 9 will give $42\frac{1}{2}°$, for $o$ to 3 represents an angle of 30° and $o$ to 4 represents an angle of $22\frac{1}{2}°$, and the sum will therefore be $52\frac{1}{2}°$, $o$ to 9 represents 10°, and the difference therefore is equal to $42\frac{1}{2}°$. The divisions on the scale 11 are obtained in the following manner: The desired fractional angles of 90° are drawn and arcs are struck with the radius equal to the length of the scale 11. The chords sustaining said arcs are then laid off from the zero point of said scale and marked with the number which would represent the fraction of the angle of 90° which the said marked chord sustains.

Figure 3:
Figs. 3 and 4 are diagrammatic views illustrating a particular use of the ruler.
Figure 2:
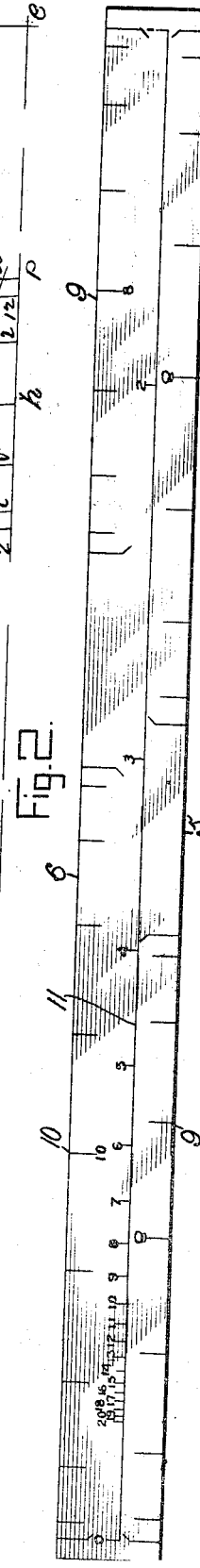
Fig. 2 is an elevation of the other face of the ruler.
Figure 4:
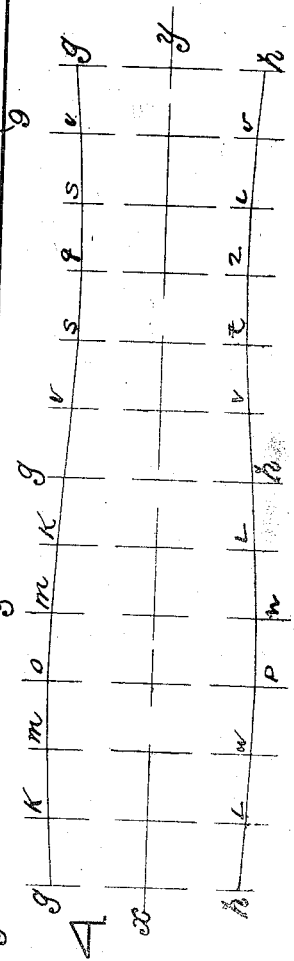

The scale 11 is particularly useful for laying out 90° elbows in the following manner: Let us suppose that an elbow of 90° in ten sections is to be developed, the diameter of the pipe being three inches and the radius of the elbow through the center of the pipe, twelve inches. Since there are ten sections, one section will be included within the angle of 9°, which is shown in Fig. 3. On the lines $o$—$e$ and $o$—$f$ from the point $o$ lay off a length of 12 inches, which is the radius of the elbow, indicated by the points $g$ $h$. By joining the points the line $g$—$h$ is formed, which is the central line of the section to be developed. On this line must lie, therefore, the center of the section, which is indicated by the letter $i$ on the line $a$—$b$ which serves as a diameter for the semicircumference A. The varying widths of a section are found by dividing the circumference into a number of equal parts in a manner previously described. The lines parallel to $g$—$h$, from the divisions of the arc A and included between the angle $e$—$o$—$f$ will give the limiting widths of sections included between said lines. By laying off the length of those lines in the proper sequence on the line $x$—$y$, which represents the length of the circumference of the pipe, divided according to the semicircumference A, see Fig. 4, a complete section is developed. If $g$—$h$ is the joint line it will also be the center line of the section $x$—$y$. By laying off the lines found to each side of $g$—$h$ in Fig. 3, the configuration of the section is determined. The proper lines in Fig. 4 are indicated by corresponding letters in Fig. 3, wherefrom the development of the section can be easily followed.

It will be noted that the scales 5, 6, and 11 have been used to develop a section of an elbow. In place of the scale 8 the scale 9 or 10 might have been used. In certain cases, only two of the three mentioned scales are used; in other cases, only one may be used; but in complicated work of the class mentioned the combination formed by the three scales is employed. It will therefore be seen that by means of my scales the development of an ordinary complicated pattern is considerably simplified, with little possibility of mistake, and the work is considerably expedited and rendered more certain.

I claim:

In a rule of the class described, a scale having divisions reading from a common reference point, said divisions being so related to the full scale length that if an arc is struck from a point on a straight line with the full scale length as a radius and so as to intersect said line and then a second arc is struck from the intersection of the first arc with the straight line, and with a radius equal to the distance from a selected division mark to the reference point and so as to intersect the said first arc and a line is drawn through said last mentioned intersection to the first mentioned point on the straight line an angle is formed which forms that fraction of a 90° angle which is indicated by the division used for intersecting the first mentioned arc.

ALBERT BASIL CLARDY.